No. 638,675. Patented Dec. 5, 1899.
F. L. STEWART.
SWINE TROUGH.
(Application filed Apr. 13, 1899.)
(No Model.)

Witnesses.
A. Allgier,
A. W. Joannes.

Inventor.
Frank L. Stewart
By Ithiel J. Cilley
Attorney.

UNITED STATES PATENT OFFICE.

FRANK L. STEWART, OF BOYNE FALLS, MICHIGAN.

SWINE-TROUGH.

SPECIFICATION forming part of Letters Patent No. 638,675, dated December 5, 1899.

Application filed April 13, 1899. Serial No. 712,943. (No model.)

*To all whom it may concern:*

Be it known that I, FRANK L. STEWART, a citizen of the United States, residing at Boyne Falls, in the county of Charlevoix and State of Michigan, have invented certain new and useful Improvements in Feeding-Troughs for Swine, of which the following is a specification.

The objects of my invention are, first, to provide a trough that may be drawn out of the reach of the swine to be filled; second, to provide for conveniently emptying refuse from the trough, and, third, to so arrange the trough that one swine cannot interfere with another when several are eating from the same trough. I attain these objects by the mechanism illustrated in the accompanying drawings, in which—

Figure 1:
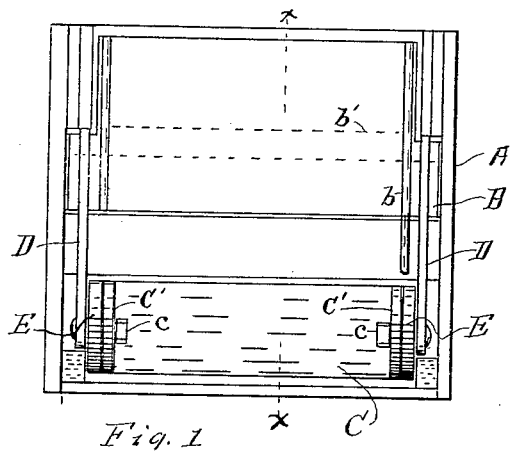
Figure 2:
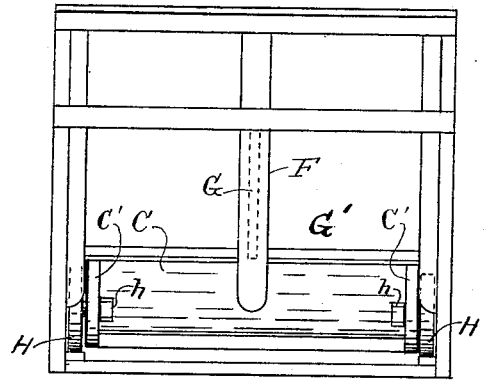
Figure 3:
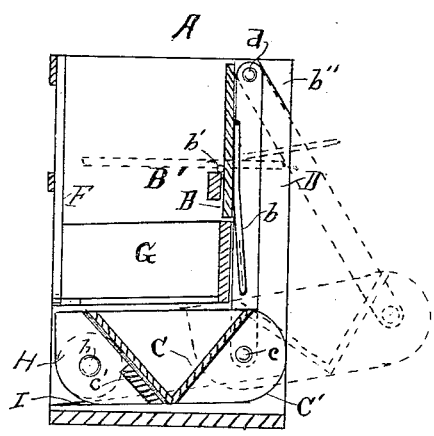

Figure 1 is a front elevation of my device. Fig. 2 is a back elevation of the same. Fig. 3 is a transverse section of the same on the line $x\ x$ of Fig. 1; and Fig. 4 shows the trough and its immediate supports disconnected from the frame in which it is contained and the trough tipped bottom up, as in the act of emptying refuse out of it preparatory to putting in food.

Similar letters refer to similar parts throughout the several views.

The frame A may be presumed to be a portion of the pen in which the swine are confined, a portion of a yard-fence, or other suitable support for the trough.

Figure 4:
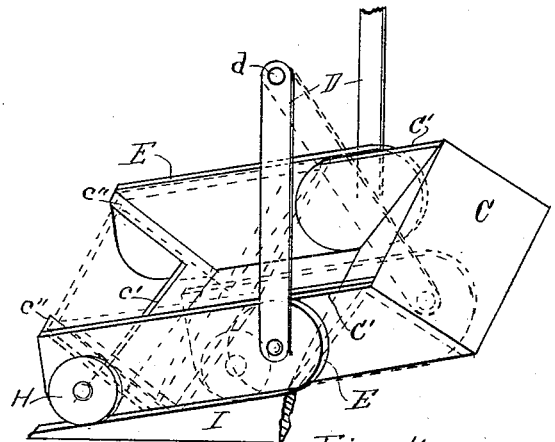

The trough C is supported in or provided with projecting ends C', that are pivoted to the sides of the supporting-frame, as at c, so that it may be thrown to the position indicated in Fig. 3 and rest right side up upon the supports c' c'' in position for the swine to feed from it, or it may be thrown over to the position indicated in Fig. 4, or bottom up, and the contents emptied from it.

The frame E is supported at one end upon the standards D, which standards are pivoted at one end to the frame A, as at d, and at the other end to the frame E, as at c, so that the trough may be thrown from the position indicated by the solid lines in Fig. 3 to the position indicated by the dotted lines in the same figure. This is accomplished by the use of the gate or lever B, which is pivoted to the cross-girth B', as at b', so that it may be swung over to the position indicated by its dotted lines, when the projecting edge, coming in contact with the standards D, will carry said standards, and with them the trough-frame and trough, out to the position indicated by the dotted lines hereinbefore referred to, where the trough is entirely out of the reach of the swine and in convenient position to empty out any refuse it may contain and to put in a new supply of food for the swine.

To facilitate the swinging of the trough to and from its normal position, I place a wheel H at each side of the back end of the frame E in position to travel on the inclined ways I, and I aim to give these ways a proper incline to exactly meet the elevation of the swinging of the standards D, so that the trough will always stand in the same relative position, thus averting the danger of slopping the contents of the trough when transferring it to or from position for the swine to eat from.

To prevent the swine from interfering with each other when feeding, I place partitions, as G, just far enough apart to allow of one swine passing his head between the partition and the end of the trough or, where there are more than two compartments, between each pair of partitions. I secure one end of the partitions to the standard F and the other end to the front of the frame A. I also place a stop $b''$ at the top of the frame A in position to stop the standards D when they are thrown out to carry the trough to position, as indicated by the dotted lines in Fig. 3, to receive the food.

$b$ represents a handle or lever with which to throw the gate B to the desired position.

The girth G', the supporting bar or girth $c'$, and the partitions G form guards that successfully prevent the swine from tipping the trough over or getting into it with their feet.

My object in making the lever B $b$ in the form of a gate is to provide a sufficient weight back of the pivot-line to more than balance the portion front of this line when the lever is thrown up to position to hold the trough out, as indicated by the dotted lines in Fig. 3.

I do not wish to restrict myself to the use of wheels to support the back end of the trough, as other effectual means—as, for instance, hanging it on four standards instead of two—and various other devices may be applied that will accomplish the result equally well.

It will be further observed that with the gate portion B of the lever extending from one standard to the other both standards must move uniformly, and thus move both ends of the trough simultaneously.

Having thus fully described my invention, what I claim as new, and desire to secure by Letters Patent of the United States, is—

1. In a trough for swine, a supporting-frame, a trough-frame, standards pivoted at one end to the supporting-frame and at the other end to the end of the trough-frame, wheels at the other end of the trough-frame, and a lever to actuate the standards to carry the trough-frame out and in, and a trough, substantially as and for the purpose set forth.

2. In combination, a supporting-frame, a trough, standards pivoted at one end to the supporting-frame and at the other end to the trough-frame upon which the trough-frame may be swung to and from place, wheels at one end of the trough-frame, inclines upon which said wheels may travel, and a trough pivoted in the trough-frame so that it may be placed in the frame right side up, or may be turned over out of the frame bottom up, substantially as and for the purpose set forth.

3. In combination, a supporting-frame, a trough-frame, said trough-frame swingingly supported in said supporting-frame a trough pivoted to one end of the trough-frame, and guards in the supporting-frame to prevent the swine from getting into the trough, substantially as and for the purpose set forth.

Signed at Boyne Falls, Michigan, April 5, 1899.

FRANK L. STEWART.

In presence of—
   E. W. THOMPSON,
   H. H. EATON.